Aug. 20, 1968    D. B. GRANZOW ET AL    3,397,628
GRAPHIC RECORDER
Filed July 28, 1965                                                    7 Sheets-Sheet 1
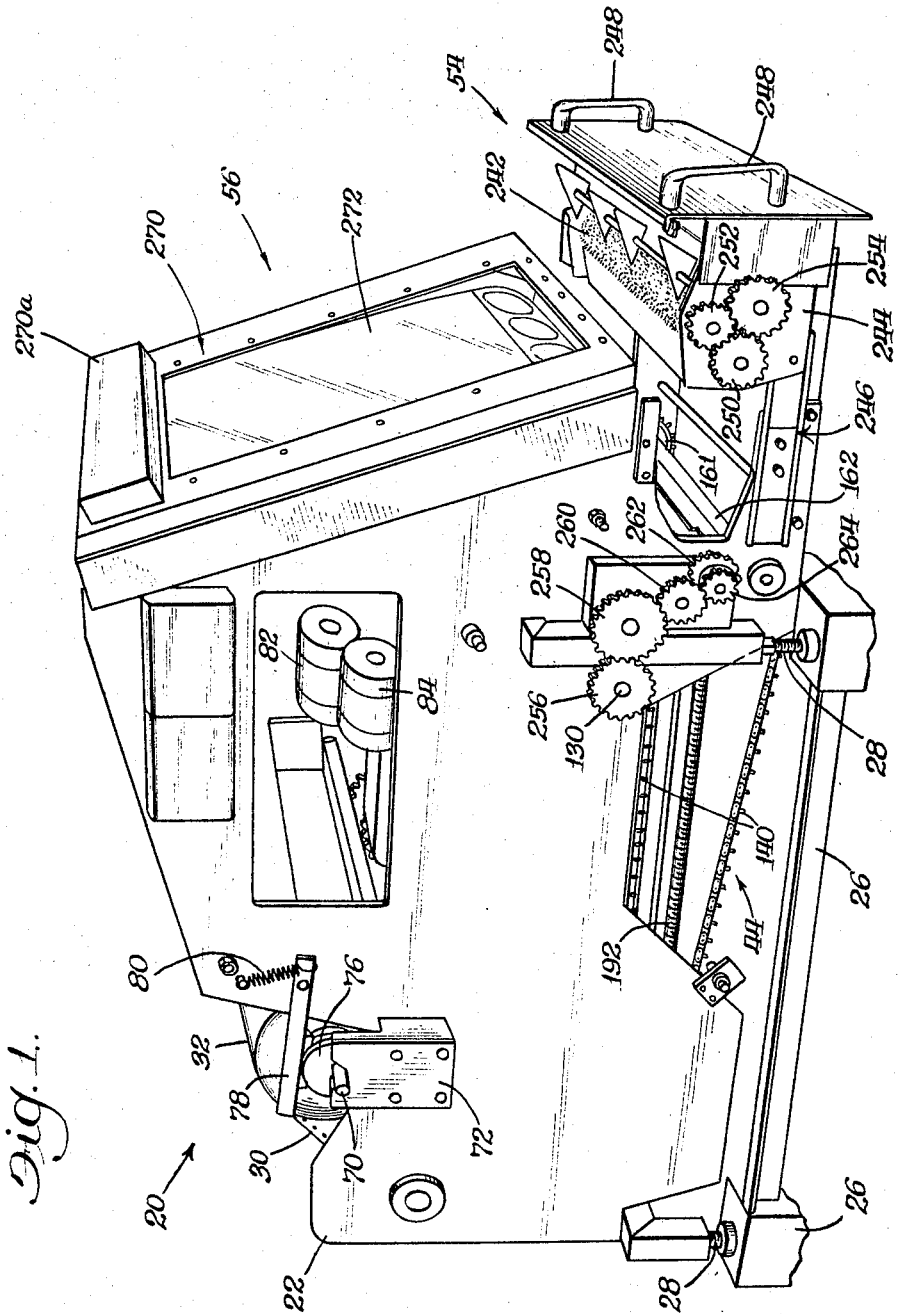
Inventors:
Daniel B. Granzow
Pervis A. Swain
Stanley A. Gawron
William P. Graff
By: Mason Kolehmainen, Rathburn & Wyss
Attys.

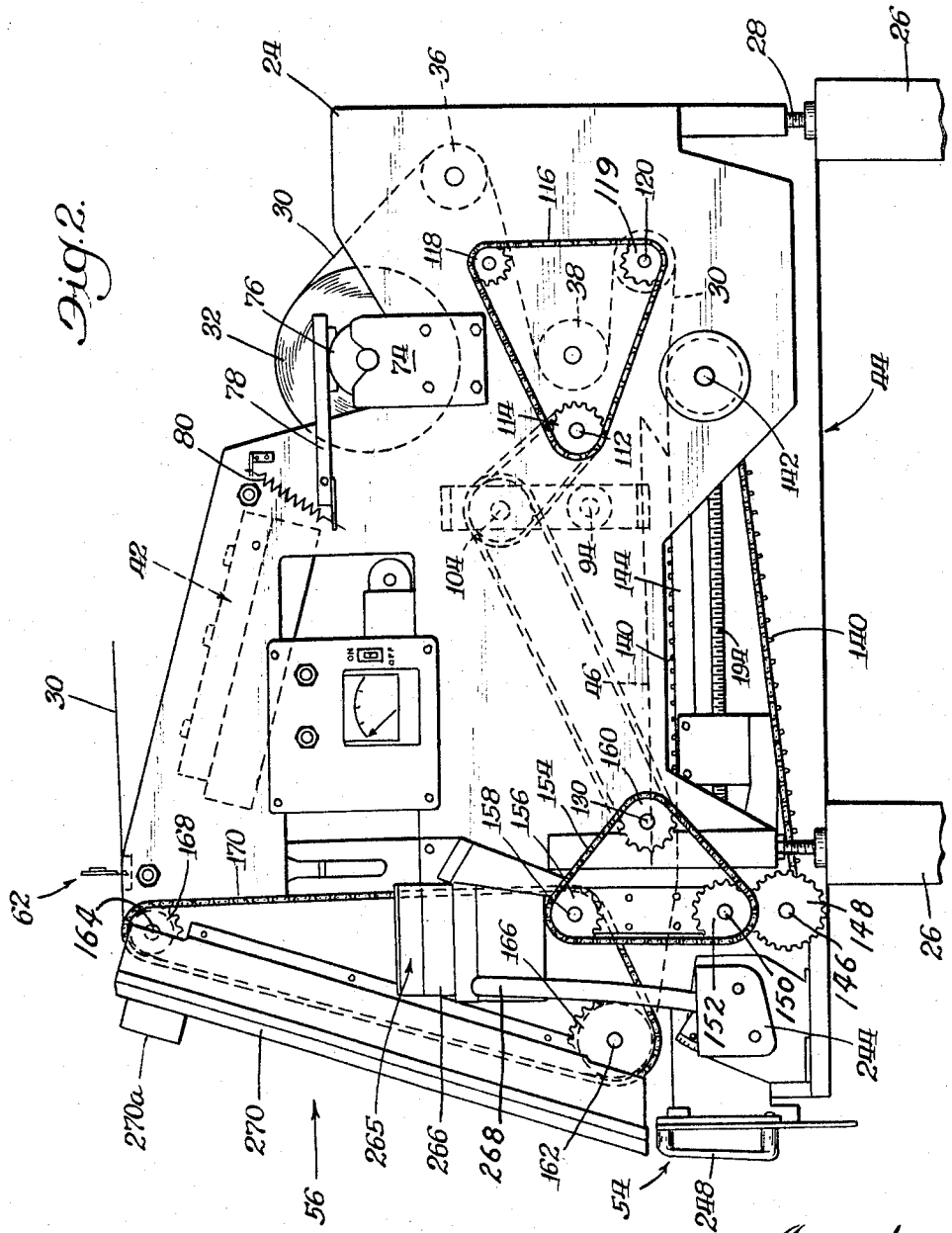

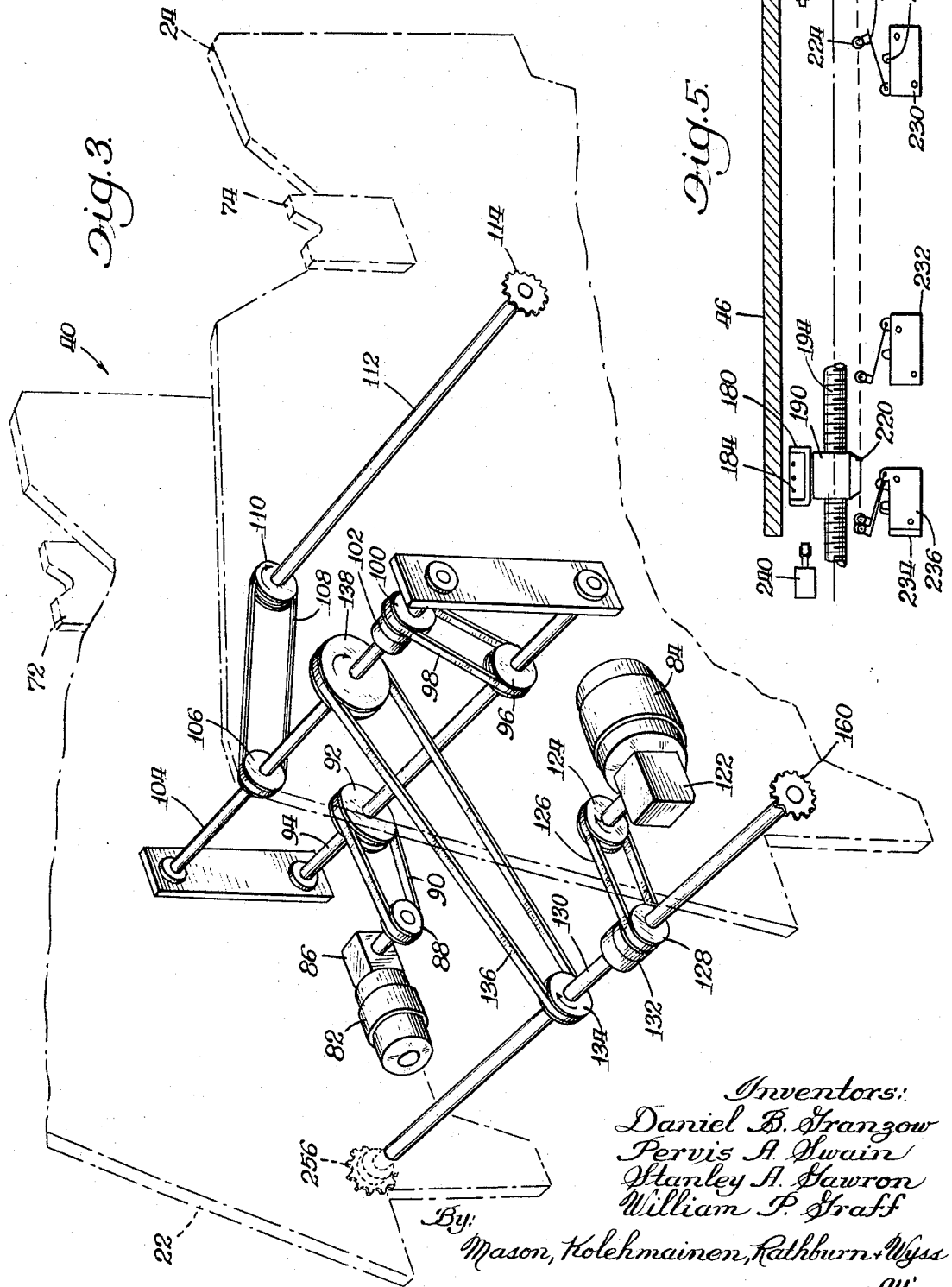

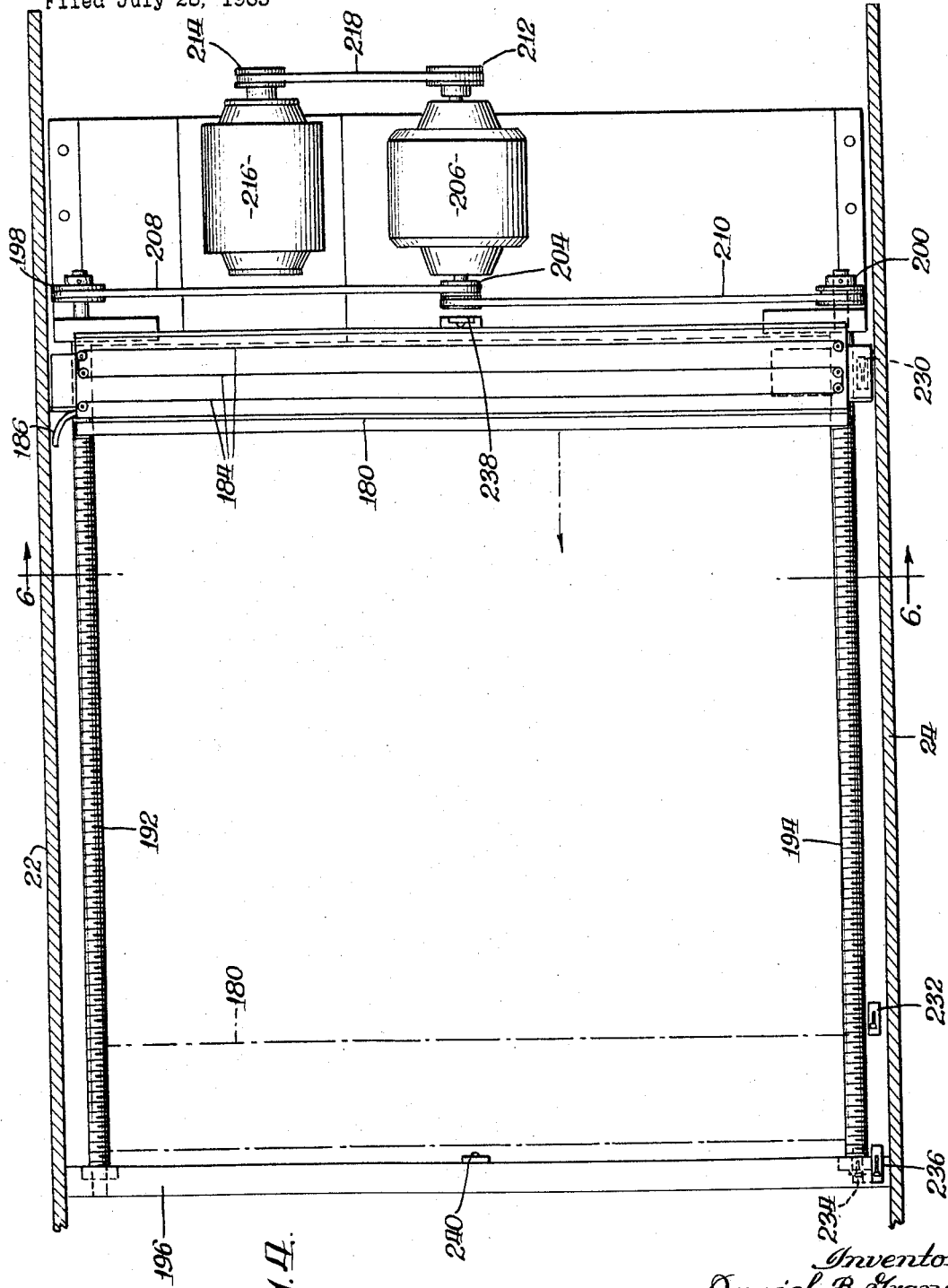

Aug. 20, 1968 D. B. GRANZOW ET AL 3,397,628
GRAPHIC RECORDER
Filed July 28, 1965 7 Sheets-Sheet 5
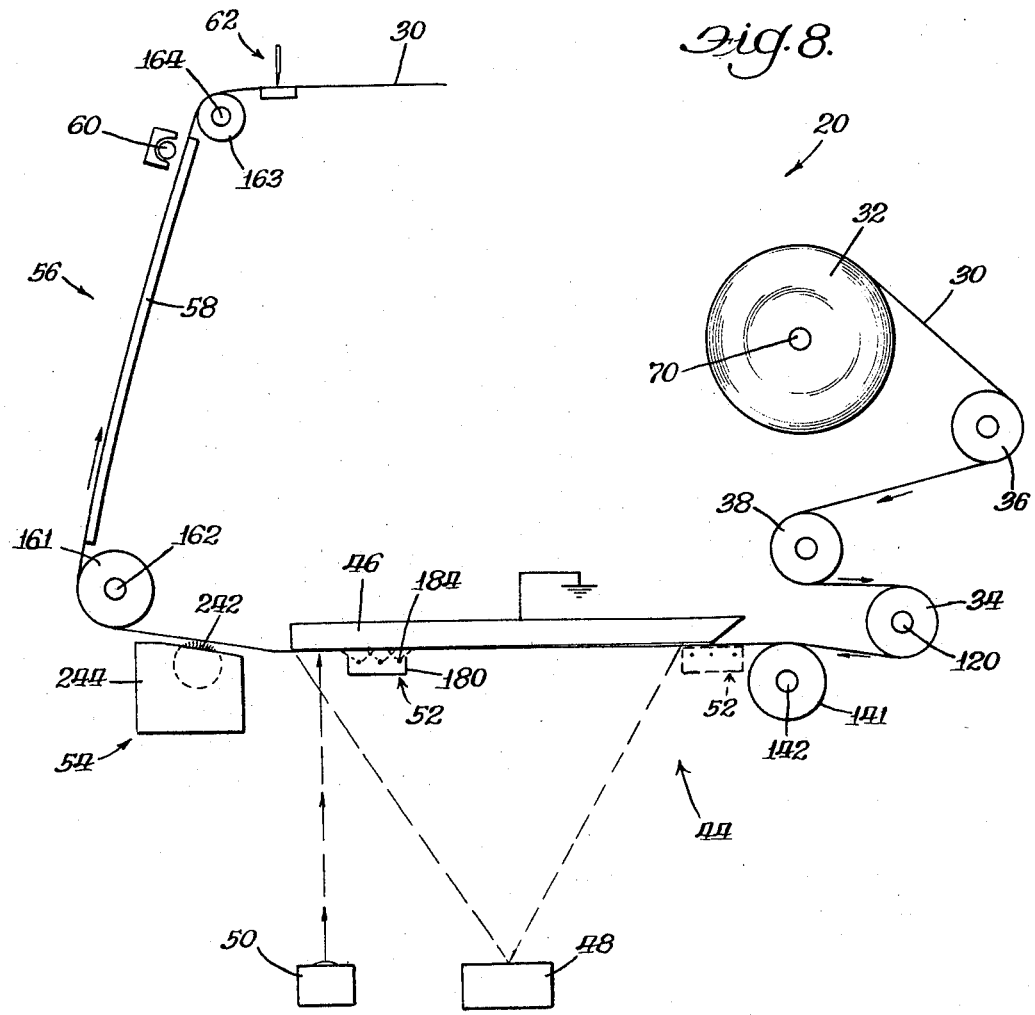
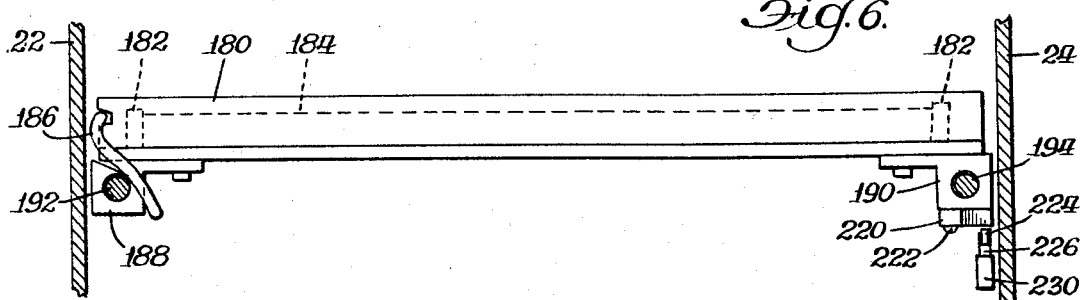
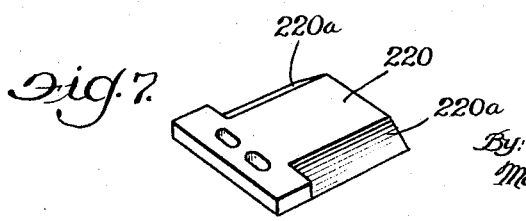
Inventors:
Daniel B. Granzow
Pervis A. Swain
Stanley A. Jawron
William P. Graff
By: Mason, Kolehmainen, Rathburn & Wyss
Attys

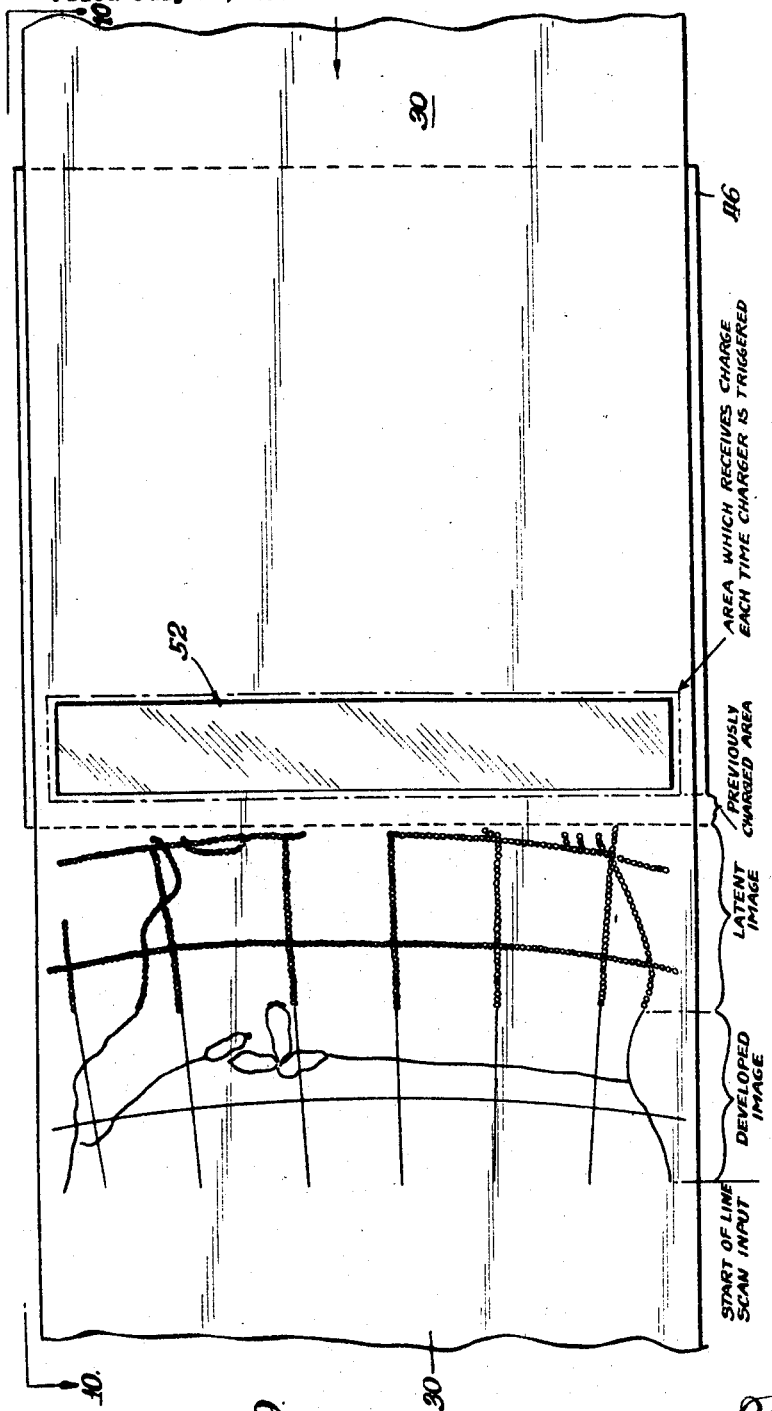
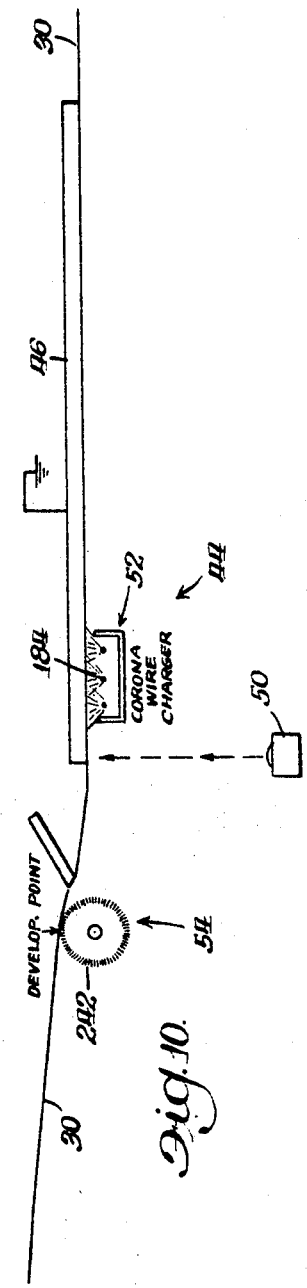

Aug. 20, 1968  D. B. GRANZOW ET AL  3,397,628
GRAPHIC RECORDER
Filed July 28, 1965  7 Sheets-Sheet 7
Fig. 11.
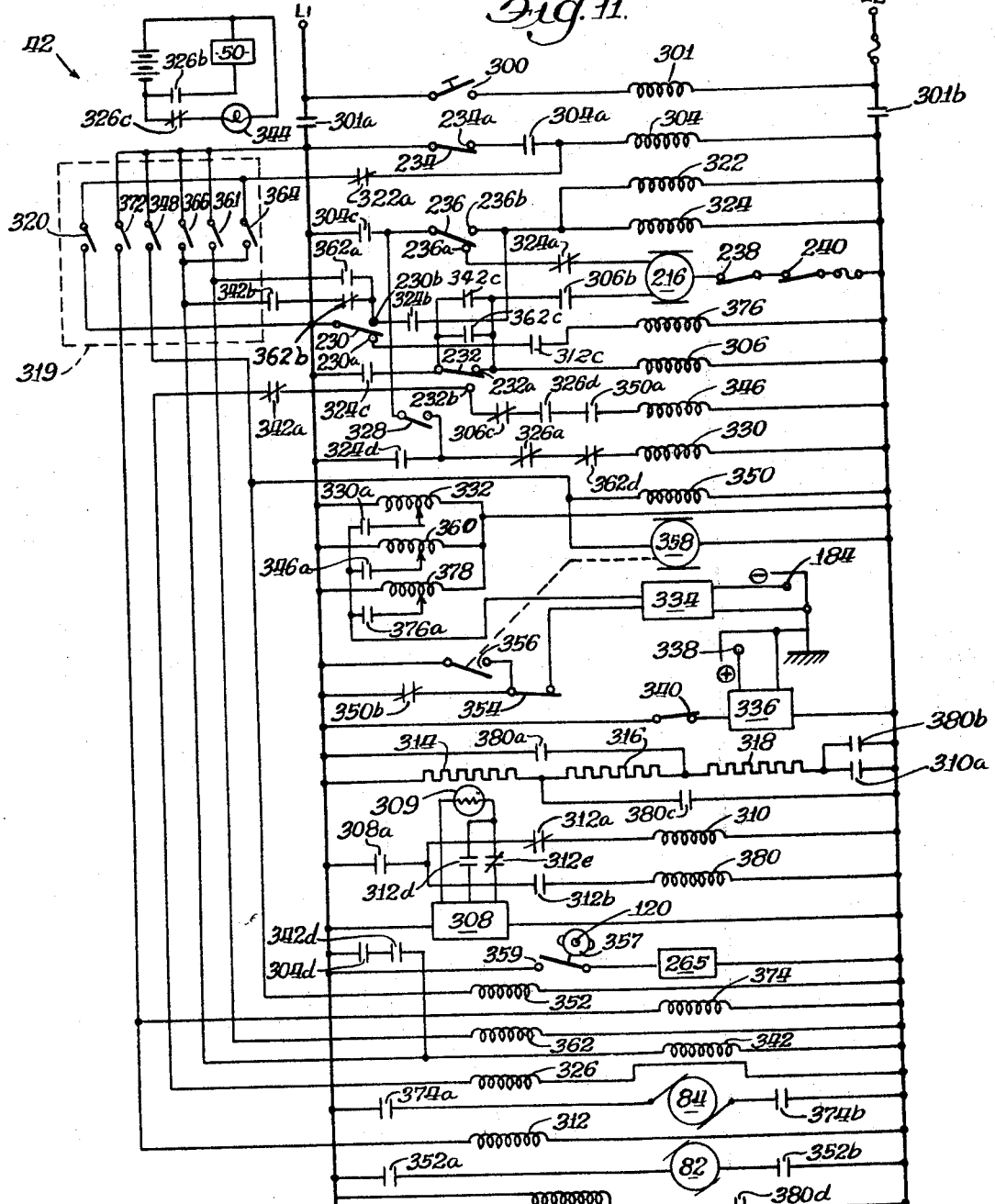
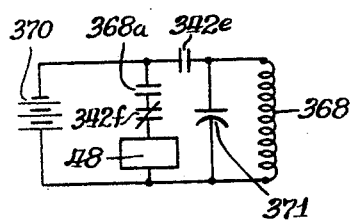
Inventors:
Daniel B. Granzow
Pervis A. Swain
Stanley A. Nowron
William P. Graff
By: Mason, Kolehmainen, Rathburn & Wyss
Attys.

3,397,628
GRAPHIC RECORDER
Daniel B. Granzow, Arlington Heights, Stanley A. Gawron, Mount Prospect, William P. Graff, Chicago, and Pervis A. Swain, Highland Park, Ill., assignors to Addressograph-Multigraph Corporation, Mount Prospect, Ill., a corporation of Delaware
Filed July 28, 1965, Ser. No. 475,522
23 Claims. (Cl. 95—1.7)

ABSTRACT OF THE DISCLOSURE

The copying machine includes both line and frame exposing means for a photoelectrostatic member and controls for conditioning the machine to operate in one of these two modes. A movable charging assembly is positioned in different locations in the two modes by the control, and other factors such as charging voltage, speed of movement of the member, and the continuous or intermittent nature of the charging operation are changed by the control in accordance with the copying mode for which the machine is conditioned.

This invention relates to a copying apparatus of the type using photoelectrostatic material and, more particularly, to such a copying or recording apparatus that is selectively operable in a plurality of different modes.

Electrostatic or photoelectrostatic copying and recording apparatus and techniques are now used in a large variety of different applications in which their many desirable characteristics can be realized. The most common application is as a sheet or page copier in which a stationary or moving original controls the selective illumination of a photoelectrostatic member to provide a latent electrostatic image that is subsequently converted to visible form. Some of these machines expose a stationary photoelectrostatic member with a complete light image derived from the original, while others of these machines produce a latent electrostatic image using a scanning technique. The scanning technique generally used requires the simultaneous, selective exposure of an entire line area. Another type of line scanning used in some applications involves the use of a light beam which is scanned over successive increments of a line area and modulated in intensity during each scan to provide a serial intelligence input during the line scan. These different techniques all provide certain advantages which are useful in different applications, and it would be desirable to provide a single graphic copying or recording machine that is capable of being operated in more than one of these different modes.

Accordingly, one object of the present invention is to provide a new and improved graphic recorder or copying apparatus of the type using photoelectrostatic material.

Another object is to provide a new and improved graphic recorder which is capable of operation in a number of different modes.

Another object is to provide a graphic recorder or copying apparatus in which the photoelectrostatic material can be selectively illuminated using serially or concurrently presented intelligence or light input signals.

Another object is to provide a graphic recorder using a photoelectrostatic member in which a full frame on the member is selectively illuminated or in which incremental areas of successive line areas are scanned by a modulated point light beam.

A further object is to provide a graphic recorder of the type using a photoelectrostatic member including drive and charging assemblies which are selectively operable in different manners in dependence on whether the member is exposed by frame or beam scanning means.

A further object is to provide a copying machine including a movable assembly for charging a photoelectrostatic member and means for automatically adjusting the assembly to different positions in dependence on the mode of operation for which the machine is conditioned.

A further object involves the provision of a copying machine capable of operation in several different modes which includes an assembly for charging a photoelectrostatic member and control means for automatically varying the operation of the charging assembly in accordance with the mode of operation for which the machine is conditioned.

Another object is to provide a graphic recorder operable in several different modes which includes both heating means and control means for automatically varying the operation of the heating means in accordance with the mode of operation for which the recorder is conditioned.

A further object is to provide a novel method of charging a photoelectrostatic member in which the member is intermittently charged.

A further object is to provide a novel method of making copies using a photoelectrostatic member in which the rate of relative movement between the photoelectrostatic member and an electrostatic charging assembly is on the order of one inch per minute and in which the charging assembly is intermittently energized.

In accordance with these and many other objects, an embodiment of the invention comprises a graphic recording or copying machine of the photoelectrostatic type including a supply roll of photoelectrostatic copying paper having a surface that is capable of retaining a uniform electrostatic charge which is selectively dissipated by incident illumination to provide a residual or latent electrostatic charge that can be subsequently developed by the application of a toner or electroscopic powder to provide a permanent visible image. A length of material from the supply roll is advanced by a feeding assembly actuated by a drive means to feed the copy material over a grounded platen at which the sheet is charged and selectively exposed or illuminated in accordance with the graphic material to be copied to provide the latent electrostatic image. The material bearing the latent image is then advanced to a developer station, such as one including a magnetic brush, at which a toner or electroscopic powder is applied to be selectively retained on the paper in accordance with the electrostatic charge image. The powder image is then passed through a fixing station, such as a means for applying heat, which places the powder image in permanent form, and the fixed image is then discharged from the machine and the copy is severed from the continuous length of copy material by suitable cutting means.

The machine is capable of operating in two different modes to provide either full frame copying or facsimile copying in which successive lines are scanned by a flying light spot. To condition the machine for facsimile copying, a movable corona charging carriage is moved from a home position adjacent the point at which the copy paper moves into proximity to the grounded platen to a position overlying the area swept by the flying spot. At this time, the corona charging means is energized, and the corona carriage is moved in a reverse direction a short distance to impart a uniform blanket of charge to the portion of the length of copy material normally occupying the area to be scanned by the flying spot. A control circuit then places the drive means in operation to advance the copy material at a relatively low speed on the order of one inch per minute and provides an enabling signal to the facsimile input means to render the facsimile system operative to supply an intensity modulated light beam on the order of .005–.015 in diameter to scan across the copy sheet in a direction transverse to the direction of copy material movement. It has been determined that because of the relatively low speed of movement of the copy sheet during the facsimile copying and the proximity of the corona discharge wire to the area swept by the flying spot, it is not possible to use conventional charging techniques for imparting a uniform electrostatic charge to the sheet as it moves to the area swept by the flying spot. Accordingly, the control circuit in the present invention includes means for pulsing the corona wire in the charging unit so that the corona charging unit is only intermittently energized.

In this manner, a long continuous or a number of different graphic originals can be recorded on the continuously moving copy sheet in accordance with the intelligence signals serially supplied to the facsimile scanning unit. When the facsimile operation is terminated, the corona discharge assembly is deenergized, the copy material drive means is placed in an inoperative state, and the corona carriage is returned to its home position adjacent the point at which the copy sheet enters the platen area.

When the machine is to be conditioned for use with full frame graphic recording, the control circuit automatically places the corona carriage drive mechanism in operation so that this carriage sweeps over the full length of the copy material overlying the platen and then returns to its normal position adjacent the point at which the copy material enters the platen area. During this return movement, the corona wire is continuously energized so that a uniform electrostatic charge is applied to the entire area of the copy material overlying the platen. Since this material had been advanced beyond the charging assembly, it is necessary to apply a charge to this material before the first frame exposing operation can take place. When the corona carriage returns to its normal home position, it is disposed out of the image area exposed by the full frame exposing means. At this time, the control circuit supplies an enabling signal indicating that the first frame exposing operation can take place.

The frame exposing means now applies a light image corresponding to the graphic original to be copied to virtually the entire area of the copy material overlying the platen to instantaneously develop a corresponding latent electrostatic image. The control circuit then advances the exposed image past the developer station at a relatively high rate of speed while reenergizing the charging assembly to impart a uniform electrostatic charge to the new surface of the copy material moving into the exposing station. In addition, the control circuit energizes additional heating means, such as a bank of infrared lamps, to provide an additional heat source to insure fixing of the powder image. This additional heat is desirable because of the greatly increased speed at which the copy sheet is moved during the frame exposing operation. When the next frame area is moved into the exposing station, the operation of the drive means is arrested to await the next exposure operation. If at any time, a prolonged period of time elapses between the completion of an exposure operation and the consequent charging of the next segment of sheet and the time at which the next exposure operation is to take place, there is a chance that the charge on the copy material in the exposing station will become depleted. Loss of the copy or any excessive use of the copy material is prevented by operating the control circuit to cause the corona carriage to scan the entire area of the sheet in the copy station and to return to its normal home position outside of the exposure area. During this scanning operation, the corona wire is energized so that the length of copy material from which the charge may have become dissipated is recharged in preparation for the exposure operation.

Many other objects and advantages of the present invention will become apparent from considering the following detailed description in conjunction with the drawings in which:

FIG. 1 is a perspective view of one side of a graphic recorder or copying apparatus embodying the present invention shown with the developer unit in an open position;

FIG. 2 is an elevational view of an opposite side of the recording machine with the developer unit closed;

FIG. 3 is a fragmentary perspective view of a two speed drive system for feeding copy material through the machine shown in FIG. 1;

FIG. 4 is a bottom elevational view of movable corona carriage and drive means therefor;

FIG. 5 is a schematic view illustrating the relative positions of a group of switches for controlling the movable corona carriage;

FIG. 6 is a fragmentary sectional view taken generally along line 6—6 in FIG. 4;

FIG. 7 is a enlarged perspective view of a control cam carried on the movable corona carriage for selectively actuating the switches shown in FIG. 5;

FIG. 8 is a schematic view of the graphic recorder;

FIG. 9 is a schematic plan view illustrating the generation of a facsimile recording using the apparatus embodying the present invention;

FIG. 10 is a schematic view illustrating the relative positions of certain components of the apparatus used in the production of the facsimile recording shown in FIG. 9; and FIG. 11 is a schematic circuit diagram of a circuit for controlling the operation of the graphic recorder.

Referring now more specifically to FIGS. 1, 2, and 8 of the drawings, therein is illustrated a graphic recorder which is indicated generally as 20 and which embodies the present invention. The recorder 20 includes a supporting structure having, among other things, a pair of side supporting walls 22 and 24 between which are mounted substantially all of the components of the recorder 20 except the optical systems. The frame including the side walls 22 and 24 is supported on a lower frame structure 26 by a plurality of adjustable leveling feet 28. The frame and line scanning or facsimile optical systems can be disposed within the structure 26 beneath the frame including the side walls 22 and 24. The entire machine 20 is disposed within a housing (not shown) and is adapted to be mounted on the floor or other supporting structure such as a desk or table.

In its general arrangement, the graphic recorder 20 is adapted to produce copies on a length of photoelectrostatic copy material 30 (FIG. 8) fed from a supply roll 32 thereof. The copy material 30 can be of any well-known type, such as one including a flexible paper or insulating backing to which a layer of resinous material containing zinc oxide is applied. The copy material 30 preferably is provided with sprocket openings adjacent its opposite, outer edges and is advanced to a master sprocket drive roller 34 over a pair of idler or tension rollers 36 and 38. The master sprocket drive roller 34 is driven by a drive control system indicated generally as 40 (FIG. 3) at a slow rate of speed during facsimile recording and at a substantially higher speed during full frame recording. The drive system 40 is automatically conditioned for operation at different speeds in accordance with the mode of operation for which the machine 20 is conditioned by a control circuit indicated generally as 42 (FIG. 11).

The copy sheet is fed from the master sprocket drive roller 34 to an exposure station indicated generally as 44 (FIG. 8) by a sprocket chain drive assembly driven in synchronism with the master sprocket drive roller 34 by the drive assembly 40 so that the sheet is advanced to a position underlying a grounded platen 46 with the treated surface of the copy sheet faced downwardly toward a frame exposing means or optical system 48 and a line scanning assembly or optical system 50.

To provide means for imparting a uniform electrostatic charge to the treated surface of the copy material 30, a corona charging assembly indicated generally as 52 is provided. When the machine 20 is to be conditioned for facsimile recording, the control circuit 42 advances a movable carriage for the assembly 52 from a normal home position shown in dashed outline in FIG. 8 to a position interposed between the platen 46 and the scanning light source 50. The carriage is then moved in an opposite direction to the facsimile position shown in solid line in FIG. 8 during which the corona wire in the assembly 52 is energized to impart a uniform electrostatic charge to the adjacent surface of the copy material 30. When the carriage for the assembly 52 is stopped at the position shown in solid line in FIG. 8, this carriage is disposed adjacent but not interposed in the path of the scanning movement of the light beam from the assembly 50.

The control circuit 42 conditions the machine 20 for operation in the facsimile mode so that the transversely scanning light spot provided by the assembly 50 selectively discharges the copy material, line-by-line, to produce a latent electrostatic image. The copy material 30 is advanced by the drive assembly 40 at a very low speed on the order of one inch per minute when the machine 20 is operated in a facsimile mode. Because of the proximity of the charging assembly 52 to the scanning point and because of the slow speed at which the copy material 30 is advanced, the control circuit 42 includes means for automatically selecting the potential applied to the corona wire in the assembly 52 in accordance with the selection of the facsimile mode and also includes means for intermittently energizing the corona wire. When the machine 20 is returned to its normal condition at the end of the facsimile recording, the carriage for the assembly 52 is restored to the home position shown in dashed outline in FIG. 8.

When the graphic recorder 20 is to be prepared for full frame recording, the control circuit 42 moves the carriage 52 from the position shown in dashed outline in FIG. 8 to a position adjacent the left end of the platen 46. At the end of this movement, the control circuit 42 energizes the corona wire in the assembly 52 and moves the carriage back to the normal position shown in dashed outline in FIG. 8. During this movement, the length of the copy material 30 previously advanced to a position underlying the platen 46 is provided with a uniform electrostatic charge. When the carriage 52 returns to its home position, the machine 20 is conditioned for full frame recording, and the assembly 48 exposes the previously charged surface in the area indicated by dashed line in FIG. 8 to provide a latent electrostatic image of the complete graphic original to be recorded. The control circuit 42 controls the drive assembly 40 to advance the copy material 30 at a high speed during the full frame recording, and the charging assembly 52 is also controlled by the circuit 42 to impart a uniform charge to the copy material subsequently moved past the assembly 52 toward the exposure station 44.

The latent electrostatic image developed at the exposing station 44 by either the line scanning means 50 or the frame exposing means 48 is advanced by the drive means 40 to a developing station indicated generally as 54 (FIG. 8) which can comprise any suitable developing means. In the illustrated machine 20, the developing station 54 comprises a magnetic brush developer in which a toner or developer mix containing magnetic carrier particles and electroscopic powder is formed into brush-like filaments or "whiskers" to selectively deposit the electroscopic powder on the latent image for selective retention on the surface of the copy material 20 to place the image in visible form.

The developed image is advanced from the developer station 54 to a fixing or fusing station indicated generally as 56 comprising a heated platen 58 over which the back or uncoated surface of the copy material 30 is advanced to apply heat and fuse the retained toner material or electroscopic powder to place the image in permanent form. During the slow movement of the copy material 30 used during facsimile recording, a relatively small amount of heat can be provided by the heated platen 58. During the high speed advance used during full frame exposure, the platen 58 provides a greater quantity of heat which is supplemented by the heat provided by a bank or assembly of infrared lamps 60. The fixed image is discharged adjacent the top of the graphic recorder 20, and successive copies are separated from the continuous length of copy material 30 by suitable severing means, such as a knife assembly indicated generally as 62.

The supply roll 32 of copy material 30 is rotatably mounted on the supporting frame by a shaft 70 (FIGS. 1 and 2) whose opposite ends are received within V-shaped grooves in a pair of trunnion supports 72 and 74 secured to the side frame walls 22 and 24, respectively. The shaft 70 carries a pair of braking discs 76 adjacent its opposite ends interposed between the roll 32 and the trunnion supports 72, 74. These braking discs are engaged by frictional elements carried on a pair of brake levers 78 which are pivotally mounted on the side walls 22 and 24 and resiliently biased into engagement with the peripheries of the discs 76 by a pair of tension springs 80 connected between the levers 78 and the side walls 22, 24. When the roll 32 is installed in the machine 20, the free end thereof is threaded around the tensioning rollers 36 and 38, which can be spring biased to apply a light tension to the copy material 30, and the perforations on the edges of the web 30 are moved into engagement with pins on the sprocket wheels 34.

The sprocket wheels 34 are driven by the controllable drive assembly 40 (FIG. 3) which is mounted between the side walls 22 and 24 in a position generally overlying the platen 46. The drive assembly 40 includes a slow speed drive motor 82 (FIG. 3) which is used during the facsimile mode and a fast speed motor 84 which is used during full frame exposure. The drive motor 82 can, for instance, provide an output speed of .62 revolution per minute, while the fast speed motor 84 can provide an output of fifty-seven revolutions per minute. The low speed motor 82 is coupled through a gear box 86 to a pulley 88 which is connected by flexible drive belt 90 to a pulley 92 secured to a shaft 94 that is rotatably mounted between the side walls 22 and 24. The shaft 94 carries a second pulley 96 which is coupled by a drive belt 98 to a pulley 100 which is coupled by a one-way clutch 102 of conventional design to a shaft 104 that is also rotatably mounted between the side walls 22 and 24. A second pulley 106 secured to the shaft 104 and a flexible drive belt 108 couple the shaft 104 to a pulley 110 that is secured to a shaft 112 that is rotatably mounted between the side walls 22 and 24. One end of the shaft 112 is secured to a sprocket gear 114.

The teeth on the sprocket gear 114 mesh with a sprocket chain 116 (FIG. 2) which passes around an idler gear 118 and a sprocket gear 119 secured to a shaft 120 which is rotatably mounted between the side walls 22 and 24. The master register sprockets 34 are secured to the shaft 120. The sprocket gear 114 is driven in a clockwise direction (FIG. 2) so that the shaft 120 is rotated in a clockwise direction to feed the length of copy material 30 toward the exposure station 44.

The sprocket gear 114 can also be driven by the high speed motor 84 (FIG. 3). The output shaft of the motor 84 is connected through a gear box 122 to drive a pulley 124 in a clockwise direction. The pulley 124 is coupled by a belt 126 to a pulley 128 which is coupled to a shaft 130 through a conventional one-way clutch unit 132. The shaft 130, which is rotatably mounted between the walls 22 and 24 of the frame, is secured to a pulley 134 which is coupled by a drive belt 136 to a pulley 138 secured to the shaft 104. When the motor 84 is energized and the motor 82 is not energized, the shaft 104 is rotated by the motor 84 through the pulley 138 to rotate the sprocket gear 114 in a clockwise direction.

To advance the copy material 30 through the exposure station 44, a sprocket chain drive is utilized. This drive includes a pair of spaced and parallel sprocket chains 140 (FIG. 2) aligned with the side apertures or sprocket openings in the copy material 30 fed by the master register sprocket 34. The right-hand ends of the two chains 140 pass around a pair of idler sprocket gears 141 (FIG. 8) carried on a shaft 142. The upper flights of the two chains 140 are received within the channels formed in two edge supporting members 144 (FIG. 2) which support the opposite edges of the copy material 30. The supporting members 144 are spaced slightly below the grounded platen 46. At their forward or left-hand ends (FIG. 2), the sprocket chains 140 pass around two idler gears (not shown) that are generally in alignment with and somewhat below the supporting member 144 and around a pair of sprocket gears secured to a shaft 146 which is rotatably mounted between the side walls 22 and 24.

To provide means for rotating the two sprocket gears on the shaft 146, a gear 148 (FIG. 2) is secured to the shaft 146. This gear meshes with a gear (not shown) which is secured to a shaft 150 that is rotatably mounted on the side wall 24. A sprocket gear 152 is secured to the shaft 150 and is coupled to a drive chain 154 which passes around a first gear 156 secured to a shaft 158 that is rotatably mounted on the wall 24 and a second gear 160 that is secured to one end of the shaft 130 (FIG. 3). The shaft 130 is driven in a clockwise direction (FIGS. 2 and 3) by the high speed motor 84 through the belt 126 or the low speed motor 82 through the belts 90 and 136. The one-way clutch 132 prevents rotation of the pulley 128 when the shaft 130 is driven by the low speed motor 82. When the shaft 130 and the gear 160 are driven in a clockwise direction, the gear 148 is driven in a counterclockwise direction so that the upper flights of the two chain loops 140 move from right to left (FIG. 2) to advance the copy sheets through the exposure station 44.

The drive assembly 40 also includes means for feeding the developed copy material 30 through the fusing or fixing station 56 to a point at which it is ejected from the recorder 20. This feeding means includes a pair of lower sprocket wheels 161 (FIG. 1) secured to a shaft 162 (FIGS. 1 and 2) which is rotatably mounted between the side walls 22 and 24 of the frame and a pair of similar upper sprocket wheels 163 FIG. 8 secured to shaft 164 (FIG. 2) which is also rotatably mounted between the side walls of the frame. A sprocket gear 166 is secured to the shaft 162, and a sprocket gear 168 is secured to the shaft 164. A sprocket chain 170 passes around the gears 166 and 168 and also around an additional sprocket gear (not shown) which is secured to the shaft 158. Thus, when the chain 154 is advanced by rotation of the gear 160, the chain 170 is advanced to rotate the sprocket gears 166 and 168 in a clockwise direction (FIG. 2) and to rotate the connected sprocket wheels in the same direction. Thus, the copy material 30 is fed upwardly through the fusing station 56 toward the top of the recorder 20.

The charging assembly 52 (FIGS. 4–8) applies a uniform electrostatic charge to the coated surface of the copy material 30 and is automatically adjusted to different positions under the control of the control circuit 42 in dependence on the mode of operation for which the graphic recorder 20 is conditioned. Not only is the charging assembly 52 moved to different positions but also includes means for supplying different potentials of different durations to corona wire means in the assembly 52 in dependence on the mode of operation of the recorder 20. The charging assembly 52 includes an upwardly open housing 180 extending generally transverse to the direction of movement of the copy material 30. A plurality of spaced dielectric supporting elements or posts 182 are disposed within the housing 180 to support a continuous corona discharge wire 184 in a spaced position from the closed end of the housing 180 and insulated therefrom. One end of the corona wire 184 is connected to a power supply over a flexible cable 186.

To provide means for adjustably supporting the housing or carriage 180 in and for moving this carriage to a plurality of different positions, a pair of internally threaded blocks 188 and 190 (FIG. 6) are secured to the opposite ends of the carriage or housing 180 and threadedly receive a pair of lead screws 192 and 194 (FIGS. 4 and 6) which are journaled at one end in a transverse supporting member 196 (FIG. 4) of the housing. At the other end, the shafts or lead screws 192 and 194 are also rotatably journaled on the supporting frame and are each provided with one of a pair of pulleys 198 and 200. The pulley 198 is coupled to an output pulley 204 on an electrically controlled brake-clutch unit 206 of conventional design by a drive belt 208. Similarly, the pulley 200 is coupled to the pulley 204 by a drive belt 210. An input pulley 212 to the brake-clutch unit 206 is coupled to a pulley 214 secured to the output shaft of an electric drive motor 216 by a drive belt 218.

The drive motor 216 can be operated in either direction and provides means for rotating the lead screws 192 and 194 in opposite directions. When the clutch-brake unit 206 is operated to its braking condition, the output pulley 204 is positively locked against movement to instantaneously arrest movement of the lead screws 192 and 194. When the unit 206 is operated to its alternate or clutching condition, rotation imparted to the input pulley 212 by the drive motor 216 is transmitted to the output pulley 204 to rotate the lead screws 192 and 194 in the desired direction. In FIG. 4 of the drawings, the corona carriage or housing 180 is shown in its normal position. In the dashed line condition shown in FIG. 4, the corona assembly 52 occupies the alternate extreme position spaced in the forward direction of movement of the copy material 30.

The electrical actuation of the clutch-brake unit 206 and the drive motor 216 to effect scanning movement of the carriage 180 as well as the positioning thereof is controlled by the control circuit 42. To accomplish this automatic positioning of the carriage 180, the control circuit 42 includes a plurality of switches disposed adjacent the path of movement of the carriage 180 for detecting the position thereof. A first group of these switches are selectively actuated by a cam member 220 (FIGS. 6 and 7) which is secured to the bottom wall of the threaded block 190 by a plurality of machine screws 222. The cam member 220 includes a pair of inclined slopes 220a for engaging one or more rollers 224 rotatably mounted between the bifurcated ends of an operator arm 226 (FIGS. 5 and 6) which is pivotally mounted on the housing for the control switches in a position overlying an operator stem 228.

A first group of control switches are mounted on the supporting frame for the machine 20 underlying but disposed in the path of movement of the cam 220. These switches include a switch 230 (FIGS. 4 and 5) which is operated when the carriage 180 is in the normal home position illustrated in dashed outline in FIG. 8. A switch 232 is operated when the carriage 180 is in the facsimile or line scanning position shown in solid outline in FIG. 8, and a pair of switches 234 and 236 are sequentially operated when the carriage 180 reaches its extreme left-hand position shown in dashed outline in FIG. 4. In addition, the charging assembly 52 includes a safety switch 238 that is operated if the carriage 180 moves too far to the right (FIG. 8) beyond its home position and a second safety switch 240 that is operated if the carriage 180 moves too far beyond its extreme left-hand position (FIG. 8). The switches 238 and 240 are operated by engagement with the housing 180 rather than by engagement with the actuating cam 220.

The developer station 54 receives the latent electrostatic image provided at the exposure station 44 and, by the selective deposition of electroscopic powder, converts the electrostatic image into a visible image. As indicated above, the developer station 54 can comprise any conventional construction and is illustrated in FIGS. 1 and 2 as comprising a magnetic brush 242 formed by a rotating drum disposed within the influence of a magnetic field to form a toner mixture consisting of electroscopic powder and magnetic particles into fine filaments which are wiped against the surface of the copy material 30 containing the image to permit the selective deposition of the electroscopic toner powder. This magnetic brush developer unit can be of the construction shown and described in detail in U.S. Patent No. 3,003,462.

A receptacle 244 containing the magnetic brush assembly is formed as a drawer unit mounted on the frame of the machine 20 by a telescoping slide assembly 246 (FIG. 1) and having a pair of front handles 248 for moving the developer station 54 into and out of an assembled relation with the remainder of the graphic recorder 20. Three gears 250, 252, and 254 provide means for driving the components of the magnetic brush assembly and are selectively moved into and out of driving engagement with the drive assembly 40 to provide means for operating the developer assembly 54 in synchronism with the movement of the copy material 30 through the graphic recorder 20.

More specifically, a gear 256 secured to the opposite end of the shaft 130 (FIG. 3) from the gear 160 is rotated in a counterclockwise direction (FIG. 1) by the drive system 40. The gear 256 is effective through a plurality of meshed gears 258, 260, and 262 to rotate a gear 264 in a clockwise direction (FIG. 1). The gear 264 meshes with the gear 260 when the drawer containing the developer station 54 is moved to the closed position shown in FIG. 2 of the drawings. Thus, the drive system 40 operates the developer station 54 at a rate commensurate with the speed at which the copy material 30 is advanced through the graphic recorder 20.

The developer station 54 also includes an assembly 265 (FIG. 2) for automatically adding electroscopic powder to the developer mix in the receptacle 244 in proportion to the number of linear feet of copy material that is advanced through the recorder 20. This assembly includes a receptacle 266 containing a supply of electroscopic powder which can be selectively vibrated at spaced time intervals to feed electroscopic powder through a tube 268 to be discharged into the housing 244. The construction of the toner dispensing assembly 265 can be, for instance, that shown and described in detail in the copending application of Robert L. Gunto, Ser. No. 353,498, filed Mar. 20, 1964, which pending application is assigned to the same assignee as the present application.

The fusing or fixing station 56 includes the heat conducting backing member or platen 58 (FIG. 8) in which are embedded or to which are affixed a plurality of electrical resistance heating elements. The backing member 58 is disposed within a housing or cabinet indicated generally as 70 (FIG. 1) having a transparent outer wall or window 272. As the copy sheet 30 containing the toner image passes over the backing plate 58, the heat applied by this backing member to the copy material 30 fuses the toner particles and places the image in a permanent condition. The window 272 permits the fixed image to be viewed prior to its ejection from the machine. The housing 270 includes an additional housing portion 270a in which are disposed the infrared lamps 60 (FIG. 8). When the machine 20 is operated in the facsimile mode with the low speed advance of the copy material 30, the control circuit 42 energizes only the heating elements affixed to the backing member 58 to provide a relatively low level of heat. However, when the graphic recorder 20 is in its full frame mode, the heating elements are energized by the control circuit 42 to provide a higher level of heat, and this heat is supplemented by the energization of the infrared lamps 60.

The operation of the graphic recorder 20 is described below in conjunction with the description of the operation of the control circuit 42 in both the facsimile and the frame recording modes. Assuming that the corona carriage 180 is in the normal home position shown in dashed line in FIG. 8 and in solid line in FIG. 4, the switch 230 is operated to a condition in which a pair of contacts 230a are closed and a pair of contacts 230b are opened. The machine is placed in operation by closing a switch 300 to energize the operating winding of a relay 301 to close two pairs of normally open contacts 301a and 301b. The closure of the contacts 301a and 301b connects an alternating current input potential source to the control circuit 42 to provide power for controlling the various functions to be performed by the machine. The input potential also energizes a fullwave rectifier bridge 302 to provide a source of direct current power for controlling the brake-clutch control unit 206 for the carriage drive motor 216. Two windings 206a and 206b in the control unit 206 are energized over a circuit including two pairs of normally closed contacts 304b and 306a on two control relays 304 and 306. When both of the windings 206a and 206b in the control unit 206 are energized, the drive unit for the carriage 180 is braked to prevent movement thereof.

In addition, when the control circuit 42 is initially energized, a temperature control unit 308 including a temperature responsive sensing element 309 normally connected to the unit 308 by a pair of normally closed contacts 312e on a relay 312 is rendered effective to sense the temperature of the backing plate or platen 58. Since this unit is not heated, the sensing unit 309 indicates to the control unit 308 that the plate 58 is below temperature, and a pair of normally open contacts 308a are closed by the unit 308. This completes an obvious operating circuit for a low heat control relay 310 over a circuit including a pair of normally closed contacts 312a on the heat control relay 312. The operation of the low heat control relay 310 closes a pair of normally open contacts 310a to connect three resistance elements 314, 316, and 318 in series across the input potential. The series connection of the three resistance elements across the line provides a low heat level which is maintained by the temperature controller 308. When the sensing unit 309 determines that the backing member 58 is at the desired temperature, the contacts 308a are opened to release the relay 310 and open the contacts 310a. This cycling continues under the control of the sensing element 309 to insure that the temperature is maintained at the desired level.

The control circuit 42 is adapted to be controlled by an external control circuit 319 which manually or automatically programs the graphic recorder 20 to its facsimile or full frame mode in dependence on incoming information, and for instance, the availablity of different types of equipment and input signal sources. In FIG. 11 of the drawings, the external control circuit 319 is shown schematically as a plurality of manually actuated switches, although these switches can be controlled conduction devices or other control components. To prepare the recorder 20 for operation in the facsimile mode, a switch 320 is momentarily closed to forward a signal over a pair of normally closed contacts 322a on a relay 322 to energize the relay 304. In operating, the relay 304 closes three normally open pairs of contacts 304a, 304c, and 304d and opens the normally closed contacts 304b. The opening of the contacts 304b terminates the energization of the winding 206b in the control unit 206 so that the brake is released from the drive system actuated by the carriage drive motor 216 and this motor is free to advance the lead screws 192 and 194. The closure of the contacts 304d performs no useful function at this time. The closure of the contacts 304a completes a holding circuit for the relay 304 extending through a pair of normally closed contacts 234a on the switch 234. This holding circuit maintains the relay 304 operated after the termination of the momentary signal provided by the switch 320 and holds this relay operated until the carriage 180 has completed its forward movement.

The closure of the contacts 304c completes an energizing circuit for forward drive winding on the corona carriage drive motor 216 which extends through a pair of normally closed contacts 236a on the switch 236, a pair of normally closed contacts 324a on a relay 324, and the two normally closed limit switches 238 and 240. When energized, the drive motor 216 operates in a forward direction to advance the corona carriage 180 from right to left (FIGS. 4 and 8). As the carriage or housing 180 leaves the home position, the switch 230 is released to open a pair of contacts 230a and to close a pair of contacts 230b. During this forward movement, the switch 232 is operated and released without effect on the circuit 42 as the assembly 52 passes the facsimile position.

It is possible to energize the corona wire 184 during this forward path of movement of the assembly 52. More specifically, if a normally open switch 328 is closed prior to placing the control circuit 42 in operation, the closure of the contacts 304c also completes a circuit for energizing a relay 330 over a circuit including the closed switch 328, a pair of normally closed contacts 326a on a relay 326, and a pair of normally closed contacts 362d on a relay 362. The operation of the relay 330 closes a pair of normally open contacts 330a so that the output potential from a tap on a transformer 332 is supplied to the input of a high voltage supply 334 which is connected to the corona wire 184. In this manner, a uniform negative electrostatic charge will be imparted to the portion of the copy material 30 overlying the grounded platen 46 during the forward movement of the carriage 180. Generally, however, the switch 328 is not closed. A power supply 336 for a corona discharge wire 338 providing bias in the developer station 54 is normally continuously energized from the input potential source over a circuit including a normally closed switch 340. The switch 340 can be opened to facilitate servicing the power supply unit 336.

The control circuit 42 remains in this condition in which the drive motor 216 is advancing the carriage 180 over the stationary copy material 30 disposed on the platen 46. When the carriage 180 reaches its extreme left-hand position (FIGS. 4 and 8), the cam member 220 engages the operator linkage for the switch 236 and operates this switch to open the normally closed contacts 236a and to close a pair of normally open contacts 236b. The opening of the contacts 236a interrupts the above-described energizing circuit for the forward winding of the drive motor 216 so that this motor is no longer energized. The concurrent closure of the contacts 236b completes an operating circuit for the relay 322 so that this relay is operated to open the normally closed contacts 322a. This opens the connection between the control relay 304 and the switch 320 to prevent reoperation of the relay 304.

The closure of the contacts 236b also completes an energizing circuit for the relay 324 so that this relay opens the contacts 324a to interrupt the forward energizing circuit for the drive motor 216 at a second point. The operation of the relay 324 also closes three pairs of normally open contacts 324b, 324c, and 324d. The closure of the contacts 324d completes the above-described circuit extending through the closed contacts 326a and 362d for energizing the control relay 330 to close the normally open contacts 330a. The closure of the contacts 330a forwards the potential derived from the transformer 332 to the input of the power supply so that the corona wire 184 is now energized at the potential desired for charging the copy material 30. Thus, the power supply 334 is energized independent of the position of the switch 328 when the corona carriage 180 reaches its left-hand position. The closure of the contacts 324b completes a holding circuit for the relays 322 and 324 extending through the closed contacts 230b on the switch 230.

The closure of the contacts 324c completes a circuit extending through a pair of normally closed contacts 232a on the switch 232 for operating the control relay 306. The operation of the relay 306 opens the normally closed contacts 306a and an additional pair of normally closed contacts 306c and closes a pair of normally open contacts 306b. The opening of the contacts 306a interrupts an additional point in the energizing circuit for the solenoid 206b to maintain the brake in the control unit 206 in a released condition. The closure of the contacts 306b completes an energizing circuit for the reverse winding of the drive motor 216 extending through the closed contacts 324c and 232a. This energization of the reverse drive winding of the motor 216 provides dynamic braking to retard the movement of the corona carriage 180 which continues to the left (FIGS. 4 and 8) under the effects of inertia even following the termination of the energization of the forward drive winding on the motor 216. During this movement, the cam 220 engages the operator for the switch 234 so that this switch is operated to open the normally closed contacts 234a. In doing so, the holding circuit for the relay 304 is interrupted, and this relay releases to close the contacts 304b and to open the contacts 304a, 304c, and 304d. The opening of the contacts 304d does not perform any useful function at this time. The closure of the contacts 304b does not energize the winding 206b because of the prior opening of the contacts 306a. The opening of the contacts 304c interrupts the above-described operating circuit for the relays 322 and 324, but these relays remain operated over the holding circuit including the closed contacts 324b.

The drive motor 216, after dynamically braking movement to the left of the carriage 180, operates the lead screws 192 and 194 to move the carriage 180 toward the right from the extreme left-hand position to the position shown in solid line in FIG. 8 of the drawings. As the carriage 180 moves to the right, the portion of the copy material 30 over which the carriage moves is provided with a uniform electrostatic charge to prepare this copy material for receiving the facsimile image. This movement also releases the switch 234 to close the contacts 234a and releases the switch 236 to close the contacts 236a and open the contacts 236b. These contact operations do not change the present operations controlled by the circuit 42.

When the carriage 180 moves into the facsimile position disposed adjacent but spaced from the area scanned by the assembly 50, the cam 220 actuates the switch 232 to open the contacts 232a and to close a pair of normally open contacts 232b. The opening of the contacts 232a interrupts the circuit for energizing the reverse direction winding of the motor 216 so that this motor is no longer energized. The opening of the contacts 236a also interrupts the operating circuit for the relay 306 so that this relay releases to restore the contacts controlled thereby to their normal condition. The opening of the contacts 306b interrupts an additional point in the energizing circuit for the reverse winding of the motor 216. The closure of the contacts 306a energizes the solenoid or winding 206b in the control unit 206 so that brakes are applied to the drive system to arrest the lead screws 192 and 194 in a position in which the corona carriage 180 is properly disposed relative to the area exposed by the facsimile scanning unit 150. The closure of the contacts 306c does not perform any useful function at this time.

The closure of the contacts 232b completes an operating circuit including the closed contacts 324c and a pair of normally closed contacts 342a on a relay 342 for energizing and operating the relay 326. The operation of the relay 326 opens the contacts 326a and an additional pair of normally closed contacts 326c, and closes two pairs of normally open contacts 326b and 326d. The opening of the contacts 326a interrupts the energizing circuit for the relay 330 so that the contacts 330a are opened to disconnect the transformer 332 from the input of the high voltage supply unit 334. Thus, the corona wire 184 is no longer energized. The opening of the contacts 326c terminates the illumination of a lamp 344 to provide a visible indication that the graphic recorder 20 has been prepared for a facsimile operation. The corresponding closure of the contacts 326b forwards a recorder ready signal to the facsimile scanning unit 50 to indicate that facsimile recording can be initiated. The closure of the contacts 326d prepares a portion of an operating circuit for the control relay 346.

The graphic recorder 20 and the control circuit 42 remain in this condition until a demand signal is received indicating that facsimile signals are present for reproduction. At this time, the external control circuit 319 applies a continuous demand signal represented by the closure of a switch 348. The closure of the contacts 348 completes an operating circuit for a pair of relays 350 and 352. The operation of the relay 352 closes two pairs of normally open contacts 352a and 352b to connect the slow speed drive motor 82 across the input potential source. This energizes the motor 82 and is effective through the drive system 40 shown in FIGS. 1–3 of the drawings to advance the copy material 30 through the graphic recorder 20 at a low speed on the order of one inch per minute. The energization of the slow speed drive motor 82 also is effective to actuate the magnetic brush assembly at the developer station 54.

The operation of the relay 350 closes a pair of normally open contacts 350a and opens a pair of normally closed contacts 350b. The opening of the contacts 350b interrupts a circuit extending through a normally closed switch 354 to the power supply circuit 334. The circuitry of the power supply 334 is such that the opening of the circuit including the contacts 350b renders the power supply 334 incapable of energizing the corona wire 184. The application of a potential to the corona wire 184 is now transferred to a pair of cam driven contacts 356 which are actuated by a timing cam driven by a motor 358.

The closure of the contacts 350a completes an operating circuit over the closed contacts 324c, 232b, 306c, and 326d for operating a relay 346. The operation of the relay 346 closes a pair of normally open contacts 346a to connect an adjustable tap on a transformer 360 to the input of the high voltage potential source 334. Thus, the transformer 360 now supplies the power supply circuit 334 with a potential in a range suitable for charging the copy material 30 during facsimile recording, and the control or operability of the power supply circuit 334 to supply potential to the corona wire 184 is transferred to the cam controlled contacts 356.

The closure of the switch 348 in facsimile recording not only controls the operation of the relays 350, 352, and 346 in the manner described above, but also completes an energizing circuit for the drive motor 358 so that the contacts 356 are periodically opened and closed. In one control circuit 42 constructed in accordance with the present invention, the contacts 356 are closed four times each minute and remain closed for a period of .5 second. This means that the power supply circuit 334 supplies a high potential (around 4000 volts) to the corona wire 184 in a magnitude determined by the setting of the transformer 360 for a period of .5 second four times during each one minute interval. This intermittent charging is desirable with the slow speed (1.2 inches per minute) at which the copy material is moved past the corona wire 184. Although the reason for the desirability of the pulsed charging of the copy material is not completely understood, it appears that there is an interaction between the zinc oxide coating on the copy material 30 and light emanating from the corona discharge wire 184 that produces a form of spontaneous discharge of the copy material 30 and a resultant inability to store an adequate latent image. It also appears that with continuous charging, there is an interaction or "cross talk" between the portion of the copy material 30 selectively discharged by the means 50 and the charged area at the developer station 54 that negates the charged level of the latent image and causes print reversal. All of these phenomena which were detected with customary continuous charge application are removed using the pulsed charging technique.

FIGS. 9 and 10 of the drawings schematically illustrate the operation of the graphic recorder 20 during the facsimile mode. As described above, the corona wire charging assembly 52 charges the portion of the copy material 30 underlying the platen 46 and disposed between extreme left-hand position of movement of the carriage 180 and the illustrated facsimile position of the carriage 180. When the recorder 20 is placed in operation by the closure of the switch 348 in the manner described above, the slow drive motor 82 is placed in operation to advance the copy material 30, and the facsimile recording or optical means scans an intensity modulated light beam providing a light dot of .005–.015 inch diameter transversely across the copy sheet 30 to expose a line segment. During this interval, the corona wire 184 in the charging assembly 52 is pulsed to charge additional areas of the copy material as it moves to the light scanning area.

In a representative example of a facsimile recording, the light beam provided by the assembly 50 can be modulated to provide a weather map which is developed line-by-line. As illustrated in FIG. 9, the scanning by the beam from the unit 50 develops a latent electrostatic image corresponding to the information which is to be recorded which is advanced beyond the scanning area toward the magnetic brush 242 at the developer station 54. The selectively exposed lower surface of the copy material 30 bearing the latent electrostatic image is contacted by the electroscopic powder in the magnetic brush 242 to convert the latent electrostatic image into a loose powder or developed image. The developed image then passes through the fusing or fixing assembly 56 in which the toner material is fused to provide a permanent image. This operation continues for so long as facsimile signals are received by the assembly 50 or for so long as the facsimile demand represented by the closed switch 348 persists. When the facsimile input information is no longer available, the demand signal terminates, as represented by the opening of the switch 348, and the relays 346, 350, and 352 are released to restore the control circuit 42 in the graphic recorder 20 to a condition in which it is conditioned for facsimile reproduction, but in which the drive assembly 40 and the corona discharging assembly 52 are not activated. However, whenever the facsimile demand signal is returned, the closure of the contacts 348 again places the recorder 20 in operation.

During the facsimile or frame recording, a cam 357 on the drive shaft 120 periodically closes a switch 359 to connect a dispensing drive means in the toner feed assembly 265 across the potential source. Since the shaft 120 is driven in direct proportion to the linear length of copy material consumed by the machine 20, the periodic closing of the contacts 359 to energize the toner dispensing control 265 causes an amount of toner to be fed from the assembly 265 to the magnetic brush 244 that is proportionate to or dependent on the linear length of copy material 30 developed by the graphic recorder 20.

When the graphic recorder 20 is returned to a normal condition by cancelling the conditioning for facsimile recording, the control unit 319 provides a momentary facsimile cancel signal by momentarily closing a switch 361. The closure of the switch 361 completes an operating circuit for the relay 362 which closes two pairs of normally open contacts 362a and 362c and opens the closed contacts 362d and a pair of normally closed contacts 362b. The opening of the contacts 362d prevents the operation of the relay 330 and the energization of the corona wire 184 during movement of the carriage 180 to its home position. The closure of the contacts 362a completes a holding circuit for the relay 362 extending to the closed contacts 230b on the home switch 230. The closure of the contacts 362c provides a shunt around the facsimile switch 232 and completes an operating circuit for the relay 306 extending through the closed contacts 324c. The operation of the relay 306 again opens the contacts 306a and 306c and closes the contacts 306b.

The opening of the contacts 306c interrupts an additional point in the energizing circuit for the relay 346. The opening of the contacts 306a terminates the energization of the solenoid 206b in the brake-clutch control unit 206 so that brake is removed from the drive to the lead screws 192 and 194. The closure of the contacts 306b completes the energizing circuit for the return of reverse winding of the carriage drive motor 216 so that the carriage or housing 180 is now moved to the right (FIGS. 4 and 8) from the facsimile position shown in solid outline in FIG. 8 toward the normal home position shown in solid line in FIG. 4.

As the carriage or housing 180 moves away from the facsimile position toward the home position, the facsimile switch 232 is released to open the contacts 232b and to close the contacts 232a. The closure of the contacts 232a completes an additional operating circuit for the relay 306. The opening of the contacts 232b interrupts an additional point in the operating circuit for the relay 346 and also interrupts the holding circuit for the relay 326 so that the contacts 326b and 326d are opened and the contacts 326a and 326c are closed. The opening of the contacts 326d interrupts an additional point in the operating circuit for the relay 346. The opening of the contacts 326b removes the facsimile ready signal from the control unit 50. The closure of the contacts 326c illuminates the lamp 344 to indicate that the machine is not conditioned for facsimile operation. The closure of the contacts 326a prepares an operating circuit for the relay 330 which is interrupted at the open contacts 362d.

When the carriage 180 returns to its normal home position, the cam 220 engages the operator for the switch 230 and actuates this switch to open the contacts 230b and to close the contacts 230a. The opening of the contacts 230b interrupts the holding circuit for the relays 322, 324, and 362 so that these relays release to restore their contacts to their normal conditions. The release of these relays terminates the energization of the carriage drive motor 216 and completes the energizing circuit for the winding 206b in the clutch-brake control unit 206 so that the carriage 180 is braked in its home position. Thus, all of the control relays are restored to their normal conditions, and the machine 20 is in a condition in which the control circuit 42 can be controlled by the external control unit 319 to place the machine 20 in a condition for facsimile recording or full frame recording.

When full frame recording is to be performed by the graphic recorder or copying apparatus 20, the external control unit provides a conditioning signal to the control circuit 42 by momentarily closing two switches 364 and 366. When both of the switches 364 and 366 are closed, an operating circuit for the relay 304 is completed extending through the closed contacts 322a. The operation of the relay 304 closes the contacts 304a to complete a holding circuit to maintain the relay 304 operated when the switch 364 is opened. The operation of the relay 304 performs substantially the same function as set forth above when this relay is operated to prepare the graphic recorder 20 for facsimile operation. Thus, the opening of the contacts 304b terminates the energization of the winding 206b to release the brake, the closure of the contacts 304d prepares a portion of a holding circuit for the relay 342, and the closure of the contacts 304c completes the circuit for energizing the forward winding of the motor 216. Thus, the drive motor 216 now rotates the lead screws 192 and 194 to advance the carriage 180 of the corona charging assembly 52 in a forward direction from right to left in FIGS. 4 and 8.

The closure of the switch 366 completes an operating circuit for the relay 342 so that this relay operates to open the normally closed contacts 342a and an additional pair of closed contacts 342f and to close a plurality of pairs of contacts 342b, 342c, 342d, and 342e. The closure of the contacts 342d in combination with the prior closure of the contacts 304d completes a holding circuit for the relay 342 to maintain this relay operated when the switch 366 is opened. The closure of the contacts 342b prepares an additional holding circuit for the relay 342 which is interrupted at the open contacts 230b. The opening of the contacts 342a interrupts an additional point in the above-described operating circuit for the relay 326 to prevent operation of this relay when the facsimile switch 232 is operated. The closure of the contacts 342c provides a shunt across the contacts 232a of the switch 232.

The opening of the contacts 342f interrupts a point in a circuit for supplying a conditioning signal to the full frame recording assembly 48, and the closure of the contacts 342e completes an operating circuit for a relay 368 extending to a potential source or battery 370. The operation of the relay 368 closes a pair of normally open contacts 368a. The closure of the contacts 342e also initiates the charging of a capacitor 371.

As the carriage or housing 180 is moved away from home position toward the left-hand position, the home switch 230 is operated to open the contacts 230a and to close the contacts 230b. The closure of the contacts 230b completes the above-described holding circuit extending over the contacts 362b and 342b for maintaining the relay 342 in an operated condition.

The circuit 42 remains in this condition as the carriage 180 moves to the extreme left-hand position. During this movement, the switch 232 momentarily opens the contacts 232a and closes the contacts 232b, but this contact actuation does not provide any useful function. When the carriage 180 reaches its extreme left-hand position, the switches 234 and 236 are again operated to perform the functions described above of interrupting the energization of the forward winding of the drive motor 216, of providing dynamic braking for the motor 216, and of energizing the reverse winding of the motor 216 so that the lead screws 192 and 194 are now rotated in a direction to return the carriage 180 to its extreme right-hand or home position. Incident to this operation, the relays 306, 322, 324, and 330 are operated, and the relay 304 is released. The relay 330 again closes the contacts 330a so that the voltage derived from the transformer 332 is again applied to the input of the power supply circuit 334 to energize the corona discharge wire 184 during the reverse movement of the carriage 180. This imparts a uniform electrostatic charge to the entire length of the copy material 30 underlying the grounded platen 46. The switches 234 and 236 are released as the carriage 180 moves toward the home position. During this reverse movement, the operation of the facsimile switch 232 does not produce the operations described above by which the carriage 180 is stopped in the facsimile position because the contacts 232a are shunted by the closed contacts 342c and because the open contacts 342a disconnect the facsimile control relay 326 from the switch 232.

When the carriage 180 returns to its home position after charging the full extent of the copy material 30 overlying the platen 46, the switch 230 is operated by the cam 220 to open the contacts 230b and to close the contacts 230a. The opening of the contacts 230b interrupts the holding circuit for the relays 322 and 324 so that these relays release. In addition, the opening of the contacts 230b interrupts the holding circuit for the relay 342 so that this relay releases. The release of these relays also interrupts the holding circuit for the relay 306 so that this relay releases. Thus, all of the control relays in the circuit 42, with the exception of the input relay 301, are now released. The carriage 180 is in its normal home position moved beyond the field of exposure of the full frame exposing assembly 48 (see FIG. 8), and the portion of the copy sheet 30 to receive the full frame exposure has been uniformly charged with the desired electrostatic field. Since it is possible for the charging carriage 180 to make a complete pass over the full area of the copy material 30 underlying the platen 46, this surface can be charged and subsequently exposed. This avoids the waste of copy material 30 inherent in advancing a full frame length of this copy material past a charging assembly which is maintained in a fixed home position.

In addition, when the relay 342 is released, the closure of the contacts 342f completes a circuit for supplying a short duration signal to the assembly 48 to indicate that the graphic recorder 20 is in condition for full frame recording. The opening of the contacts 342e when the relay 342 releases interrupts the operating circuit for the relay 368, but this relay is rendered slow-to-release by the capacitor 371 which discharges through the winding of the relay 368 to maintain this relay operated for a predetermined period of time. At the end of this time delay, the relay 368 releases to open the contacts 368a and removes the conditioning signal from the recording unit 48.

With the assembly 48 now in condition for operation, the external control unit 319 applies a signal to the assembly 48 so that a light image corresponding to the graphic original to be recorded is directed on the charged surface of the copy material 30 disposed adjacent the platen 46 so as to selectively discharge the uniform electrostatic image and provide a latent electrostatic image corresponding to the original to be recorded. The area covered by the full frame exposure includes the area blocked by the charging assembly 52 when this assembly is in its facsimile position. However, the entire surface of the copy sheet 30 can be utilized because of the movement of the charging assembly 52 to its home position prior to operation of the recorder 20 in its full frame mode. If, for some reason, the copy material 30 is not exposed within a given period of time following the application of the uniform electrostatic charge in the manner described above, the switches 364 and 366 can again be momentarily operated to cause the reapplication of a charge.

Following the development of a latent electrostatic image, the external control unit 319 forwards a signal to the circuit 42 of a duration sufficient to move the exposed portion of the copy sheet 30 beyond the platent 46 and to initiate the process of developing and fusing the previously exposed portion of the copy material 30. This signal is represented by the closure of a switch 372 which completes an operating circuit for the relay 312 and a high speed motor control relay 374. The operation of the relay 374 closes two pairs of normally open contacts 374a and 374b to connect the high speed drive motor 84 across the input potential source. This places the drive assembly 40 in operation to advance the copy material 30 at high speed through the machine 20 and to operate the magnetic brush assembly at an increased rate of speed. The operation of the relay 312 closes three pairs of normally open contacts 312b, 312c, and 312d and opens the contacts 312a and 312e. The closure of the contacts 312c operates a relay 376 to close a pair of normally open contacts 376a so that a transformer 378 is connected to the input of the power supply 334 to supply a potential of around 6500 volts to the corona discharge wire 184 when the copy material 20 is moved at high speeds relative to the corona charging assembly 52. Thus, as the previously exposed section of the copy material 30 is moved beyond the platen 46, the material moving onto the platen is supplied with a uniform electrostatic charge by the assembly 52.

The operation of the relay 312 also conditions the fixin assembly 56 for a higher temperature operation to provide sufficient heat to fuse the electroscopic particles in the visible image as the copy material 30 moves at higher speed through the fixing unit 56. More specifically, the opening of the contacts 312a interrupts the intermittently completed operating circuit for the relay 310 so that the contacts 310a remain open. The closure of the contacts 312b prepares an operating circuit for a high heat relay 380 extending to the contacts 308a controlled by the temperature controller 308. Since the assembly 56 has been operating at low temperature, the opening of the normally closed contacts 312e and the closure of the normally open contacts 312d converts the temperature controller 308 and the senser 309 to regulate the temperature of the platen 58 to a higher level. Accordingly, the senser 309 controls the control unit 308 to immediately close the contacts 308a because of the lower temperature of the platen 58. The closure of the contacts 308a completes an operating circuit for the relay 380 so that this relay operates to close four normally open pairs of contacts 380a, 380b, 380c, and 380d. The closure of the contacts 380a and 380b places the heating element 318 directly across the line and thus increases the current flow therethrough. The closure of the contacts 380c connects the heating element 314 directly across the input potential source, and the closure of the contacts 380a and 380c connect the heating element 316 directly across the potential source. Thus, the heat provided by the three resistance elements 314, 316, and 318 is substantially increased. The closure of the contacts 380d energizes the infrared lamps 60 to provide supplemental heat directed on the image bearing surface rather than the opposite surface of the copy material 30 as it passes through the fixing assembly 56.

As indicated above, the switch 372 remains closed to maintain the above-described circuit conditions until sufficient copy material has been advanced to move the previously exposed portion of this material beyond the frame exposing area. At such time, the switch 372 is momentarily opened, and the assembly 48 exposes the next frame area on the material 30. The switch 372 is then reclosed to produce the same operations described above. This intermittent operation continues until such time as all desired full frame printing has been completed. The control circuit 42 can be operated to condition the graphic recorder 20 for facsimile recording at any desired time by sequential operation of the switches 320 and 348 in the manner described above.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A copying apparatus using photoelectrostatic copying material comprising a charging assembly for imparting an electrostatic charge to the material, drive means for producing relative movement between the material and the charging assembly in a first direction and relative movement between the charging assembly and the material in a direction opposite to the first direction, and control means controlled in accordance with the direction of relative movement for rendering the charging assembly effective to impart a charge to the material during only one of the directions of relative movement.

2. The copying apparatus set forth in claim 1 including additional control means for rendering the charging means effective to impart a charge to the material during both directions of relative movement.

3. A copying apparatus using a photoelectrostatic member comprising a charging assembly for imparting an electrostatic charge to the member, drive means for producing relative movement between the member and the charging assembly in a first direction and relative movement between the charging assembly and the member in a second direction opposite to the first direction, voltage supply means for energizing the charging assembly with potentials of different values, and control means controlled in accordance with the direction of relative movement for controlling the voltage supply means to energize the charging assembly with potentials of different values in accordance with the different directions of movement.

4. A copying apparatus using photoelectrostatic copying material comprising a charging assembly for imparting an electrostatic charge to the material, means mounting the charging assembly adjacent the material for movement in a plane generally parallel to the material, drive means connected to the charging assembly for moving the charging assembly to at least two different spaced positions relative to the material, and control means for placing the drive means in operation and including selector means for selecting the position to which the charging assembly is to be moved and for terminating operation of the drive means when the charging assembly reaches the selected position.

5. A recording apparatus using a photoelectrostatic member comprising a charging assembly for imparting an electrostatic charge to the member, means mounting the charging assembly adjacent the member for movement relative to the material, first drive means connected to the charging assembly for moving the charging assembly relative to the member, second drive means for moving the member relative to the charging assembly, controllable means for energizing the charging assembly, and control means for controlling the controllable means to selectively energize the charging assembly and for selectively operating the first and second drive means so that the member is charged by movement of the charging assembly relative to the member and by movement of the member relative to the charging assembly.

6. The recording apparatus set forth in claim 5 in which the control means includes means for applying different potentials to the charging assembly when the member is moved relative to the charging assembly and the charging assembly is moved relative to the member.

7. A copying apparatus using a photoelectrostatic member comprising a charging assembly for imparting an electrostatic charge to the member, means mounting the charging assembly adjacent the member for movement relative to the material, drive means connected to the charging assembly for moving the charging assembly to at least two different spaced positions relative to the member, line exposing means for selectively illuminating a line area on the member, frame exposing means for selectively illuminating a frame area on the member larger than the line area, and control means for conditioning a selected one of the line exposing means and frame exposing means for operation and including means connected to the drive means for operating the drive means to place the charging assembly in different ones of the two positions in accordance with the selection of the line and frame exposing means.

8. A copying machine for use with a photoelectrostatic member comprising a movable charging assembly for imparting an electrostatic charge to the member, driving means for moving the assembly in a direction generally parallel to the member, a plurality of switch means disposed adjacent the path of movement of the assembly and selectively actuated as the assembly moves to different positions relative to the member, control means connected to the drive means for controlling the operation of the driving means, and selector means connected to the control means and including the switch means for moving the charging assembly to different positions relative to the member.

9. A copying machine for use with a photoelectrostatic member comprising a movable charging assembly for imparting an electrostatic charge to the member, driving means for moving the assembly relative to the member, a plurality of switch means disposed adjacent the path of movement of the assembly and selectively actuated as the assembly moves to different positions relative to the member, voltage supply means for applying different potentials to the charging assembly, and control means connected to the drive means and the voltage supply means and including the switch means for controlling the driving means to move the charging assembly to different positions relative to the member and for controlling the voltage supply means to apply different potentials to the charging assembly at the different positions.

10. A copying machine for use with a photoelectrostatic member comprising a movable charging assembly for imparting an electrostatic charge to the member and normally disposed in a home position, driving means for moving the assembly in a first direction away from the home position to a displaced position and back to the home position from the displaced position in a second direction opposite to the first direction, switch means disposed adjacent the path of movement of the assembly and selectively actuated as the assembly moves to a point disposed between the home and displaced positions, and control means connected to the drive means for controlling the operation of the driving means, said control means including the switch means and being operable to one setting to control the drive means to move the charging assembly from the home position to the displaced position and back to the home position, said control means also being operable to a second setting in which it is controlled by the switch means to move the charging assembly from the home position to said point disposed between the home and displaced positions.

11. A copying machine using a photoelectrostatic member comprising first means for selectively illuminating a first area of the member, second means for selectively illuminating a second area on the member substantially greater than the first area, a charging assembly for imparting an electrostatic charge to the member, means movably mounting the charging assembly, drive means for moving the charging assembly between a first position disposed adjacent the first area and a spaced second position adjacent the second area, and control means coupled to the drive means and the first and second means for selecting the first and second means and for moving the charging assembly to the first and second positions in accordance with the selection of the first and second means.

12. A copying machine using a photoelectrostatic member comprising first means for selectively illuminating a first area of the member, second means for selectively illuminating a second area on the member substantially greater than the first area and including the first area, a movably mounted charging assembly for imparting an electrostatic charge to the member, drive means for moving the charging assembly between a first position adjacent the first area and interposed in the second selectively illuminated area and a second position adjacent but not interposed in the second selectively illuminated area, and control means coupled to the drive means and the first and second means for selecting the first and second means and for moving the charging assembly to the first and second positions in accordance with the selection of the first and second means.

13. A copying machine using a photoelectrostatic member comprising first drive means for moving the member along a path, a movably mounted charging assembly for imparting an electrostatic charge to the member, second drive means for moving the charging assembly to different predetermined positions relative to the path of movement of the member, and control means connected to the first and second drive means for controlling the first drive means to move the member at different selected speeds and for controlling the second drive means to move the charging assembly to different positions relative to the path in accordance with the speeds at which the member is moved.

14. A copying machine using a photoelectrostatic member comprising first drive means for moving the member along a path at different speeds, a movably mounted charging assembly for imparting an electrostatic charge to the member, second drive means for moving the charging assembly to different predetermined positions relative to the path of movement of the member, and control means connected to the first and second drive means, said control means including first means for controlling the second drive means to move the charging assembly to a selected one of the different positions relative to the path and second means operative after the charging assembly has been positioned for initiating operation of the first drive means to move the member relative to the positioned charging assembly at a speed selected in accordance with the position in which the charging assembly is disposed.

15. A copying machine for use with photoelectrostatic material comprising an exposing station for selectively illuminating the material, a charging assembly having corona means for imparting an electrostatic charge to the material, drive means for moving the material relative to the exposing station and the charging assembly at at least two different speeds, and control means for controlling the drive means to move the material at a selected one of the different speeds, said control means including means for supplying different voltages to the corona means in dependence on the speed at which the material is moved.

16. A copying machine for use with photoelectrostatic material comprising an exposing station for selectively illuminating the material, a charging assembly having corona means for imparting an electrostatic charge to the material, drive means for moving the material relative to the exposing station and the charging assembly at at least two different speeds, and control means for controlling the drive means to move the material at a selected one of the different speeds, said control means including means for applying a continuous voltage to the corona means when the material is moved at one of the different speeds and for applying an intermittent voltage to the corona means when the material is moved at another one of the different speeds.

17. A copying machine using a photoelectrostatic member comprising drive means for moving the member along a path at different speeds, an exposing station along the path for providing a charge image on the member, a developing station along the path for developing the charge image particulate material, heating means disposed along the path for applying two levels of heat to the developed image, and control means connected to the drive means for controlling the drive means to move the member along the path at a selected one of the different speeds and for controlling the heating means to apply a level of heat to the developed image determined by the speed at which the member is moved.

18. A copying machine using photoelectrostatic material comprising a supply of the photoelectrostatic material, a charging assembly for imparting an electrostatic charge to the material, a line exposing means for repeatedly scanning and selectively illuminating line areas on the charged material to produce an electrostatic line image, a frame exposing means for selectively illuminating a frame area on the material to produce an electrostatic frame image, developing means for developing the electrostatic images, drive means for moving the material from the supply and past the charging assembly, exposing means, and developing means in sequence, said drive means being operable to move the material at at least two different speeds, and control means operable to one setting to select the line exposing means for exposing the material and to a different setting to select the frame exposing means for exposing the material, said control means including means for selecting different speeds of operation for the drive means in accordance with the selection of the line and frame exposing means.

19. A copying machine using photoelectrostatic material comprising a supply of the photoelectrostatic material, a movable charging assembly for imparting an electrostatic charge to the material, first drive means for moving the charging assembly to different positions relative to the material, a line exposing means for repeatedly scanning and selectively illuminating line areas on the charged material to produce an electrostatic line image, a frame exposing means for selectively illuminating a frame area on the material to produce an electrostatic frame image, developing means for developing the electrostatic images, second drive means for moving the material from the supply and past the charging assembly, exposing means, and developing means in sequence, and control means operable to one setting to select the line exposing means for exposing the material and to a different setting to select the frame exposing means for exposing the material, said control means including means coupled to the first drive means for moving the charging assembly to different positions in accordance with the selection of the line and frame exposing means.

20. A copying machine using photoelectrostatic material comprising a supply of the photoelectrostatic material, a charging assembly for imparting an electrostatic charge to the material, controllable voltage supply means for energizing the charging assembly with different potentials, a line exposing means for repeatedly scanning and selectively illuminating line areas on the charged material to produce an electrostatic line image, a frame exposing means for selectively illuminating a frame area on the material to produce an electrostatic frame image, developing means for developing the electrostatic images, drive means for moving the material from the supply and past the charging assembly, exposing means, and developing means in sequence, and control means operable to one setting to select the line exposing means for exposing the material and to a different setting to select the frame exposing means for exposing the material, said control means including means for controlling the controllable voltage supply means to supply different potentials to the charging assembly in accordance with the selection of the line and frame exposing means.

21. A copying machine using photoelectrostatic material comprising a supply of the photoelectrostatic material, a charging assembly for imparting an electrostatic charge to the material, a line exposing means for repeatedly scanning and selectively illuminating line areas on the charged material to produce an electrostatic line image, a frame exposing means for selectively illuminating a frame area on the material to produce an electrostatic frame image, developing means for developing the electrostatic images, heating means for heating the developed image and operable to two different heating levels, drive means for moving the material from the supply and past the charging assembly, exposing means, developing and heating means in sequence, said drive means being operable to move the material at at least two different speeds, and control means operable to one setting to select the line exposing means for exposing the material and to a different setting to select the frame exposing means for exposing the material, said control means including means for selecting different speeds of operation for the drive means and different heating levels for the heating means in accordance with the selection of the line and frame exposing means.

22. A copying machine using photoelectrostatic material comprising a supply of the photoelectrostatic material; a movable charging assembly for imparting an electrostatic charge to the material; first drive means for moving the charging assembly to different positions relative to the material; controllable voltage supply means for supplying different potentials to the charging assembly; a line exposing means for repeatedly scanning and selectively illuminating line areas on the charged material to produce an electrostatic image; a frame exposing means for selectively illuminating a frame area on the material to produce an electrostatic frame image; developing means for developing the electrostatic images; second drive means for moving the material from the supply and past the charging assembly, exposing means, and developing means in sequence, said drive means being operable to move the material at at least two different speeds; and control means operable to one setting to select the line exposing means for exposing the material and to a different setting to select the frame exposing means for exposing the material, said control means including first means for controlling the first drive means to select the position of the charging assembly, second means for controlling the voltage supply means to select the potential to be supplied to the charging assembly, and third means for selecting the speed of operation of the second drive means in accordance with the selection of the line and frame exposing means.

23. An electrophotographic apparatus using an electrophotographic member comprising a charging assembly operable between a continuous mode in which said member is continuously charged and an intermittent mode in which the member is intermittently charged, drive means for moving the member relative to the charging assembly at at least two different speeds, and control means coupled to the charging assembly and the drive means for selecting the continuous or intermittent mode of operation of the charging assembly in dependence on the speed at which said member is moved.

References Cited

UNITED STATES PATENTS 2,778,946  1/1957  Mayo _____ 250—49.5
3,090,287  5/1963  Ritzerfeld _____ 95—1.7
2,990,280  6/1961  Giaimo _____ 96—1
3,148,601  9/1964  Trumbull _____ 95—1.7

JOHN M. HORAN, *Primary Examiner.*